July 14, 1964  M. P. L. SIEBEL  3,140,690
MAGNETIC PRESSURE INDICATOR

Filed Dec. 4, 1963  3 Sheets-Sheet 1

July 14, 1964 M. P. L. SIEBEL 3,140,690
MAGNETIC PRESSURE INDICATOR
Filed Dec. 4, 1963 3 Sheets-Sheet 2

July 14, 1964   M. P. L. SIEBEL   3,140,690
MAGNETIC PRESSURE INDICATOR
Filed Dec. 4, 1963   3 Sheets-Sheet 3

United States Patent Office 3,140,690
Patented July 14, 1964

3,140,690
MAGNETIC PRESSURE INDICATOR
Mathias P. L. Siebel, Roslyn Heights, Long Island, N.Y., assignor to Pall Corporation, Glen Cove, N.Y., a corporation of New York
Filed Dec. 4, 1963, Ser. No. 327,935
12 Claims. (Cl. 116—70)

This invention relates to pressure indicating devices and more particularly to a new and improved magnetic device for detecting and indicating a pressure differential thereacross that is greater than a predetermined value in a fluid system.

In any system wherein a fluid such as oil or the like is passed through a filter, it is customary to provide means for indicating when the filter element has become loaded and requires replacement. Since the pressure drop across a filter increases in proportion to the accumulation of dirt therein, a suitable indication may be obtained by a device as in U.S. Patent No. 2,942,572 having an indicator actuated when the differential pressure across the filter reaches a predetermined value. In such devices, it is important to prevent false indications due to accidental actuation, such as through vibration or shock, and also to prevent accidental return of the indicator to nonindicating position when a true pressure indication has been given.

In accordance with the invention, a device is provided having a first magnetic means arranged to attract a second magnetic means so long as the two means are separated by less than a predetermined distance, and bias means to propel the second magnetic element to an indicating position whenever that distance is exceeded. Retention of the second element in either the attracted or the indicating position, or both, is ensured by a third magnetic means arranged so as to attract the second magnetic means so long as it is in the first position, and/or to attract the second magnetic means so long as it is in the indicating position.

In one embodiment of the invention, the first magnetic means is movable with a piston responsive to changes in pressure and normally biased towards the second magnetic means by a predetermined force. The second magnetic means is also movable with a piston, and while retained toward the first means by magnetic attraction, when close enough thereto, is normally spring-biased in a direction away from the first means by a force capable of overcoming the magnetic attraction whenever the first and second magnetic means are separated by a predetermined distance. The third magnetic means is annular in form, and is positioned surrounding the second magnetic means, and with poles exactly opposite thereto. The third magnetic means is positioned to attract the second magnetic means and retain it in the nonindicating position whenever the first magnetic means is within the predetermined distance of the second means, and also to attract and thus retain the second magnetic means whenever it is in the indicating position, after the first and second means have been separated by actuation of the first means.

In another embodiment of the invention, the first magnetic means is movable with a flexible diaphragm, in effect, a piston of high surface area, responsive to changes in pressure and normally biased towards the second magnetic means by a predetermined force. In other respects, this embodiment is similar to the piston-type embodiment.

In order to prevent false actuation at low temperatures, due to increase in fluid viscosity, a bimetallic strip can be positioned to prevent actuation of the second magnetic means when the temperature is below a predetermined value. Such a construction is known, and is shown for example, in U.S. Patent No. 2,942,572.

Figure 1:
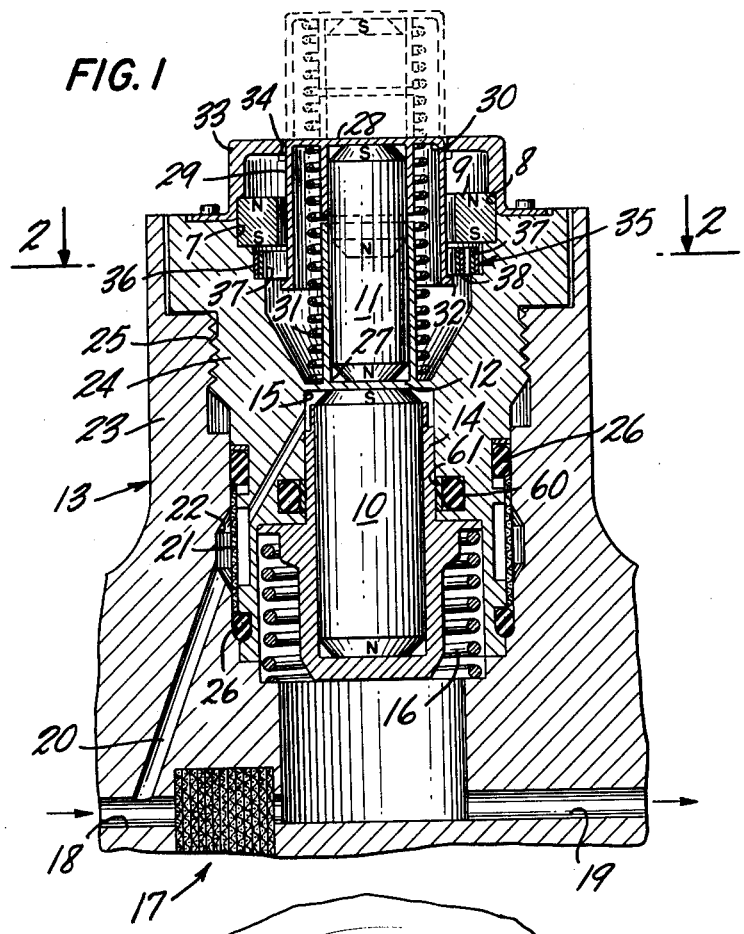
FIGURE 1 is a view in longitudinal section taken through a typical pressure indicator according to the invention.
Figure 2:
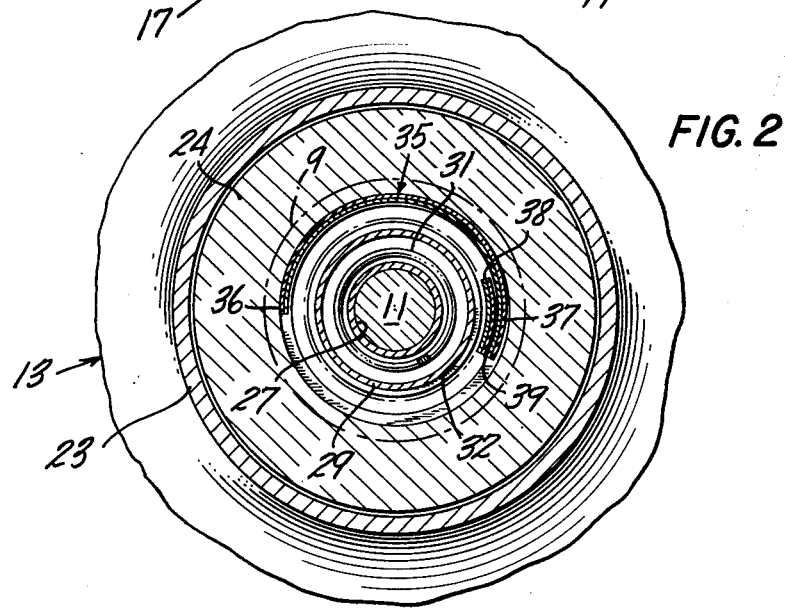
FIGURE 2 is a sectional view taken on the lines 2—2 of FIGURE 1, and looking in the direction of the arrows.

The pressure indicator of FIGURES 1 and 2 comprises first and second magnetic elements 10 and 11, respectively, coaxially mounted on opposite sides of a separating wall 12 within a housing 13. A third annularly shaped magnetic element 9 is mounted coaxially with elements 10 and 11, and surrounding the second element 11. Elements 10 and 11 are positioned adjacent the wall 12 with magnetic poles opposed so that each is drawn toward the wall by the resulting force of attraction. Element 9 is positioned with its poles opposed to those of element 11, and is so placed that when element 11 is adjacent to wall 12, the upper magnetic pole of element 9 attracts the upper and opposite pole of element 11, and thus reinforces the attraction of the first element 10 to hold the second element very firmly against the wall 12. On the other hand, when element 11 is moved upwardly away from the wall 12, it first passes through a neutral region and then enters a zone where the lower magnetic pole of the element 9 attracts and thus holds the lower pole of element 11 in the upper position. Preferably, all three magnetic elements 9, 10 and 11 are composed of permanently magnetized metal, such as Alnico VI or ceramic magnetic material or the like. If desired, however, element 10 may be formed of a suitable magnetic material, such as iron, for example.

Mounted in a tubular piston 14, magnet 10 is slidably supported in a cylindrical bore 15 in the housing 13, and is urged toward the wall 12 by a bias means which in this embodiment is a coil spring 16. In order to prevent fluid from passing from one end of the bore 15 to the other, a liquid-tight seal is provided between the bore and the piston 14 by an O-ring 60 and a ring 61 of "Teflon" or other suitable material. The coil spring 16 is selected according to the desired actuating pressure to permit the piston 14 to move downwardly in the bore 15 whenever the pressure at the upper end of the piston 14 exceeds that at the lower end by an amount equal to the actuating pressure.

In this embodiment of the invention, the pressure indicator is arranged to measure the pressure drop across a filter 17. Thus, fluid under pressure is applied to the filter from an inlet line 18 and emerges through an outlet line 19, the difference in pressure between the inlet and outlet lines being a measure of the pressure drop across and therefore the clogging of the filter. In order to detect this pressure difference, a duct 20 leads from the inlet line 18 to the end of the cylindrical bore 15 adjacent the wall 12, while the other end of the bore communicates with the outlet line 19.

If desired, in order to prevent dirt carried by the incoming fluid from reaching the bore 15, and to make certain that any fluid which might pass through the bore to the outlet line 19 is clean, a suitable filter element 21 may be inserted in an enlarged portion 22 of the duct 20. The enlarged portion 22 is a ring-shaped cavity in the housing 13 surrounding one of the magnetic elements. Within this cavity an annular filter element is inserted, thereby providing a high dirt capacity with low resistance to fluid flow. For ease in assembling and replacement of the filter element 21 the housing 13 may be separable at the enlarged area 22 into two portions 23 and 24 which are joined by screw threads 25, suitable glands 26 being provided to seal the enlarged area of the duct.

On the other side of the wall 12 the magnetic element 11 is slidably received at one end in a bore 27 coaxial with the bore 15. Secured to the opposite end of the magnet 11 by a press fit, for example, a cap 28 includes a tubular wall 29 extending towards the housing 13 and radially spaced from the magnet. The annular recess 30 thus formed receives a second bias means which in this embodiment is also a coil spring 31 which extends from the cap 28 to the housing 13 to urge the cap and the magnet 11 away from the wall 12. This spring is selected so that it is retained in the stressed condition, while the magnet 11 is held against the wall 12 by the attractive forces between magnetic elements 10 and 11, and the forces between magnetic elements 9 and 11, so long as the adjacent poles of the magnets 10 and 11 are separated by less than a predetermined distance, for example, one-sixteenth of an inch. Whenever the magnetic element 10 is moved away from the element 11 so that their adjacent poles are separated by more than one-sixteenth of an inch, however, the decreased force of magnetic attraction resulting therefrom is overcome by the force of the spring 31, and the cap 28 and element 11 are driven away from the wall 12.

The annularly shaped magnetic element 9 is held in fixed position coaxial with element 11 and radially spaced from it. Element 9 is mounted in a circular recess 7 in the housing 24, and held in position in the recess by the drum 33 which has a matching recess 8 to accommodate the upper portion of the magnetic element 9. In lieu of an annulus, the third magnetic element 9 may be made up of several individual bar magnets, appropriately spaced within the recess. Element 9 is so placed that when the magnet 11 is against the wall 12 the upper pole of magnet 11 closely approaches and is attracted by the upper and opposite magnetic pole of the magnet 9. As illustrated in FIGURE 1, when the lower north pole of magnet 11 is adjacent to wall 12, the upper south pole of magnet 11 closely approaches and is therefore attracted by the upper north pole of magnet 9. When element 11 is driven away from wall 12 by the force of the spring 31, assuming the upper indicating position shown in dotted lines, the lower north pole of magnet 11 then is adjacent to the lower south pole of magnet 9, and is attracted thereby, so that magnet 9 holds magnet 11 in the upper position. As a result, when magnet 11 is in contact with the wall, magnet 9 acts to reinforce the magnetic attraction holding magnets 10 and 11 together; but, after magnet 11 has been driven away from the wall, the magnetic element 9 then tends to hold magnet 11 in the indicating position. Hence, magnetic element 9 minimizes the possibility of false indications of excessive pressure which might be caused by the effect of shock, vibration or acceleration, acting to thrust magnets 10 and 11 apart, and also to prevent movement of the indicating element 11 away from an indicating position due to shock, vibration or acceleration, preventing observation of a warning after it has been given.

Obviously, the polarities of all three magnets can be reversed, with the same results.

In order to prevent the magnet 11 from being driven completely out of the bore 27 upon actuation, the tubular wall 29 terminates in a radial flange 32 and a drum 33 having a central aperture 34 slightly smaller than the flange 32 but large enough to permit the cap 28 to pass through it, is mounted on the housing 13. Also, a conventional bimetallic element 35 is mounted on the inside surface of the housing 13 as by a weld 36 at one end of the strip. As best seen in FIGURE 2, the bimetallic element is preferably comprised of two arcuate strip portions 37 and 38, joined by a weld 39, and both arranged to bend inwardly with increasing temperatures. At normal temperatures, element 35 which is adjacent to the wall 29 and just above the flange 32, when the indicator is not actuated, has a minimum radius greater than that of flange 32 and permits the cap 28 to ride through the aperture 34 on actuation. However, at temperatures below a preselected value, at which the viscosity of the fluid to be filtered rises appreciably, for example 32° F., the element 35 contracts inwardly so that the inner strip 38 extends over the flange 32, thus preventing actuation of the pressure indicator.

In operation, fluid under pressure from the inlet line 18 passes through the duct 20 and the filter 21 to the top of the cylindrical bore 15, urging the magnet 10 and piston 14 downwardly against the force of the spring 16 and the pressure from the outlet line 19. Whenever the different between the inlet and outlet pressures is greater than the force of the spring 16 the piston 14 is driven downwardly in the bore 15. After the magnet 10 has moved to a position more than one-sixteenth of an inch away from the magnet 11, the attractive force between magnets 10 and 11 and between magnets 9 and 11 is less than the force of the spring 31, and the magnet 11 is driven away from the wall 12 until the flange 32 abuts the inside surface of the drum 33, where it is held firmly by magnet 9. Thus the cap 28 which, if desired, may be of a suitable eye-catching color such as red, rises through the aperture 34, to indicate that the pressure difference is greater than the predetermined value in accordance with which the spring 16 has been selected. As an example, the spring 16 may be arranged to permit the magnet 10 to be driven away from the wall 12 when the pressure difference exceeds 35 p.s.i., and return when the pressure is less than 25 p.s.i.

It will be apparent that by suitable dimensioning of the drum 33 and the radial flange 32, the magnet 11 may be permitted to move more than one-sixteenth inch from the normal position of the magnet 10. In this case, the pressure indicator must be reset by manual depression of the cap 28. On the other hand, if the flange 32 is positioned to stop the magnet 11 less than one-sixteenth inch from the normal position of the magnet 10, the indicator will be automatically reset by the attractive force of the magnet 10, which is greater than that of the spring 31 and the force of attraction between magnets 9 and 11 at this distance when the magnet 10 is returned to the wall 12.

At temperatures below 32° F., for example, the thermostatic element 35 contracts to move the inner end of the strip 38 over the flange 32. Thus, when the piston 14 and the magnet 10 are moved away from the wall 12 by pressure resulting from increased viscosity of the fluid, the lower edge of the strip 38 intercepts the flange 32, preventing a false indication of filter clogging.

If desired, this pressure indicator may be utilized to indicate a total pressure above atmospheric instead of a pressure differential, by opening the bore 15 to the atmosphere. Similarly, an absolute pressure may be indicated by connecting the bore 15 to a vacuum.

Figure 3:
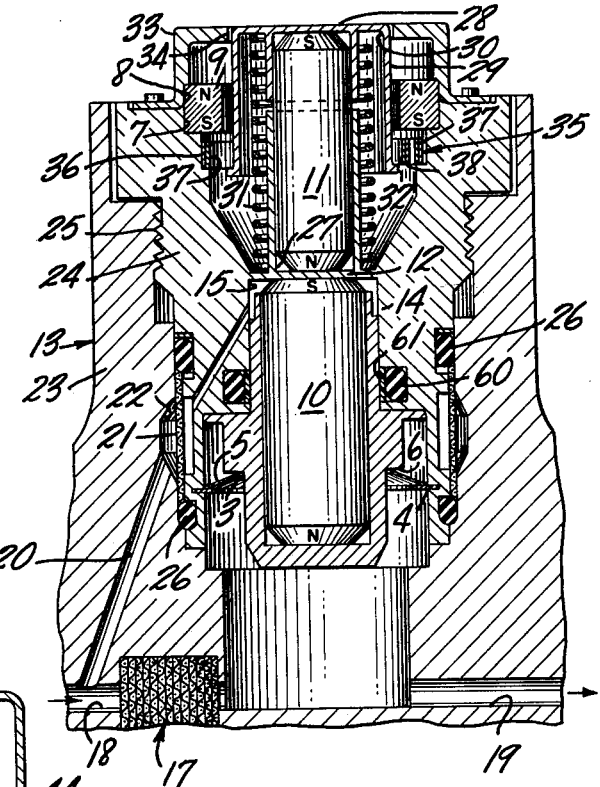
FIGURE 3 shows another embodiment of the invention, similar to FIGURE 1 but having a Belleville spring instead of a coil spring biasing the first magnetic element.

Another modification of the device of the invention is illustrated in FIGURE 3, in which an annular spring disk 5 is substituted for the coil spring illustrated in the embodiment of FIGURE 1, the structure otherwise being the same. In this case the annular spring disk is seated on a retaining ring 4 held in a groove in the bore 15. The inner periphery 3 of the disk seats beneath the cap portion 6 of the piston 14. The spring disk 5 can be selected to snap through and change direction of bow, to a negative rate portion of the curve, according to the desired actuating pressure, to permit the piston 14 to move downwardly in the bore 15 when the pressure at the upper end of the piston 14 exceeds that at the lower end, and retain that position until reset manually.

The annular spring disk 5 can also be made to flex but remain in the positive rate portion of the curve, in which event it returns to normal position when the actuating pressure is reduced, just as in the case of a coil spring.

Disk thickness, amount of bow, disk diameter and annular opening diameter are determined by the pressure differential to be resisted, i.e., the resistance to be offered by the spring action of the disk.

The spring disk is made of material of high yield strength and high hardness. Materials having minimum yield strengths of 30,000 to 250,000 p.s.i. can be used with Rockwell hardness of the order of C–45. Steel, stainless steel, and nickel chromium alloys are satisfactory as are also certain synthetic resins such as polytetrafluoroethylene and polyoxymethylene. Metal disks surfaced with a resilient natural or synthetic resin can also be used. Metal spring disks of the desired type are available commercially and are known as Belleville washers.

These spring disks can be uniform in thickness throughout, or can vary in thickness, thinner at the center than at the edge to give improved flexing and sealing.

Conditions of all kinds can be met by appropriate design of the spring disk to any load-deflection characteristics required in the system. The geometry of these disks is established by the disk's outside diameter and inside diameter, its free height measured axially, and its thickness. Proper selection of the geometry, using mathematical tables and equations of Fortini, Machine Design, September 4, 1958, "Conical-Disk Springs" will give a spring capable of response to any type of load in any desired way.

Figure 4:
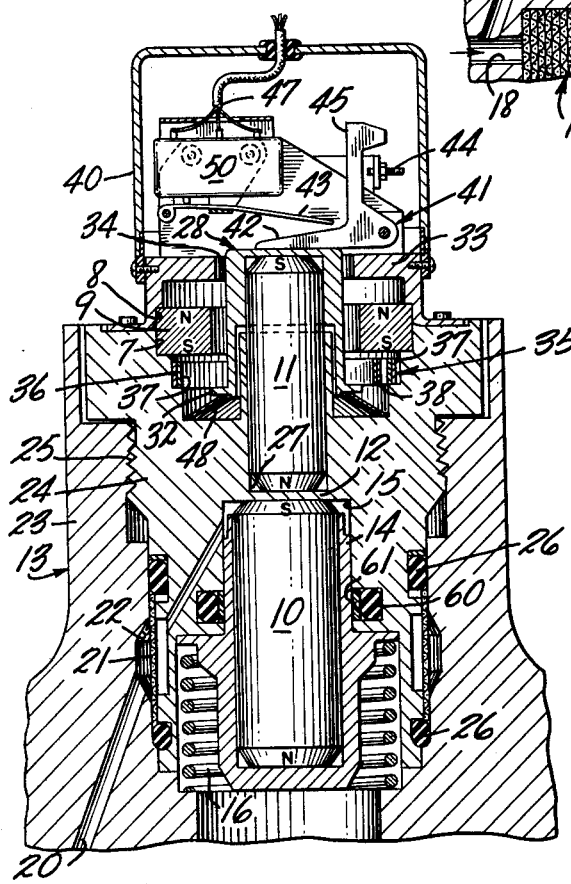
FIGURE 4 is a view in longitudinal secion through another embodiment of the pressure indicator of FIGURE 1, arranged to actuate a switch.

The pressure indicator shown in FIGURE 4 is the same as that of FIGURE 1, adapted to provide an electrical signal which, by choice of the appropriate electrical circuits in any conventional manner can be adapted, for example, to shut off flow, or to give a warning signal. The indicator comprises two magnetic elements, respectively 10 and 11, coaxially mounted on opposite sides of the wall 12 with a third, annularly shaped, magnetic element 9, mounted so as to surround the second magnetic element 11. Magnet 9 thereby acts to increase the force of magnetic attraction holding element 11 in contact with the wall before actuation of the indicator, but, after actuation, magnet 9 acts to hold element 11 in the upper, or indicating, position in the manner described in connection with FIGURES 1 and 2.

To provide an electrical signal upon actuation of the indicator, a switch 50 is mounted in a housing 40 affixed to the drum 33. Also mounted in the sleeve a lever 41 is pivotally supported with one arm 42 extending above the cap 28. Positioned above the arm 42 a switch actuator 43 is movable by the arm to actuate the switch 50 when the cap 28 rises out of the drum 33. In order to restrict the motion of the magnet 11, an adjustable set screw 44 is mounted in the housing 40 to intercept the other arm 45 of the lever 41. If desired, the screw may be set to stop the lever 41 after actuation to hold the magnet 11 within one-sixteenth inch of the normal position of the magnet 10, thereby making the indicator automatically resettable in the manner described above. If the lever motion is not so restricted, the indicator may be reset by manual rotation of the lever 41. To provide a remote indication of actuation of the indicator, suitable conductors 47 from the switch 50 are arranged in any conventional manner to complete appropriate electrical circuits whenever the switch is operated or reset.

Also illustrated in the embodiment of FIGURE 4 is the use of an annular spring disk 48 in place of the coil spring 31 used as the bias means in the embodiment of FIGURE 1. Characteristics and design criteria for the annular spring disk are as described above. One or several spring disks can be used, in the manner shown.

In operation, a source of high pressure is connected through the duct 20 to the top of the cylindrical bore 15, urging the magnet 10 and the piston 14 downwardly against the force of the spring 16. The bore 15 below the bottom of the piston can be connected to a lower pressure, in which case the device acts as a differential pressure indicator, or to the atmosphere, in which case the device acts as a total pressure indicator. Whenever the difference between the pressure in duct 20 and the pressure below the piston 14 is greater than the force of the spring 16 the piston 14 is driven downwardly in the bore 15. Under normal conditions, so long as magnet 10 has not been urged more than one-sixteenth of an inch from wall 12 by the pressure differential, the force of magnetic attraction between magnets 10 and 11 would be sufficient to overcome the force exerted by the spring disk 48 and thereby prevent actuation. However, under conditions where shock, vibration, acceleration, or the like are encountered, the effect of these forces when added to the force exerted by the spring disk 48 might be sufficient to overcome the magnetic attraction between magnets 10 and 11 were it not for magnet 9. When magnet 11 abuts wall 12, as would normally be the case before actuation, the upper pole of magnet 11 is in close proximity with the upper, and opposite pole of magnet 9 and is therefore attracted by it. This additional force of magnetic attraction, reinforcing that between magnets 10 and 11, greatly reduces the likelihood of false actuation because of the influence of shock or vibration.

However, when magnet 10 has been driven downwardly within bore 15 so that it is more than one-sixteenth of an inch from wall 12, the indicator will actuate and magnet 11 and cap 28 will be driven away from the wall until the flange 32 abuts the inner surface of drum 33, or until lever 41, which is in contact with and is rotated by cap 28, should first strike set screw 44, in which case flange 32 would not come into contact with drum 33.

As magnet 11 rises in bore 27 the magnetic force of attraction between the upper pole of magnet 9 and the upper pole of magnet 11 is, of course, diminished. However, the magnetic attraction between the lower poles of both magnets increases as the lower poles approach each other. Thus, after actuation, i.e., when magnet 11 has its upward motion stopped either by flange 32 or set screw 44, the lower poles of magnets 9 and 11 are closer to each other than are the upper poles of these same two magnets and, as a result, magnet 9 will prevent improper resetting of the indicator because of shock, vibration, acceleration or the like. Thus, magnet 9 acts both to prevent false indications of excess pressure as well as to prevent resetting once an indication of an excessive pressure differential has occurred.

Driven by the spring disk 48, the magnet 11 rises through the aperture 34, turning the lever 41 to actuate the switch 50. If the set screw 44 is appropriately adjusted to restrict the motion of the magnet 11, return of the magnet 10 to its normal position draws the magnet 11 back toward the wall 12, restoring the switch.

Figure 5:
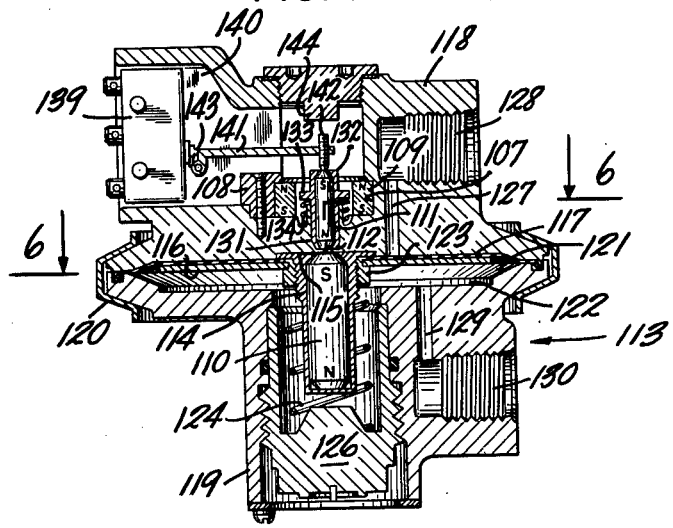
FIGURE 5 is a view in longitudinal section taken through another embodiment utilizing a diaphragm to increase sensitivity to very small changes in differential pressure.
Figure 6:
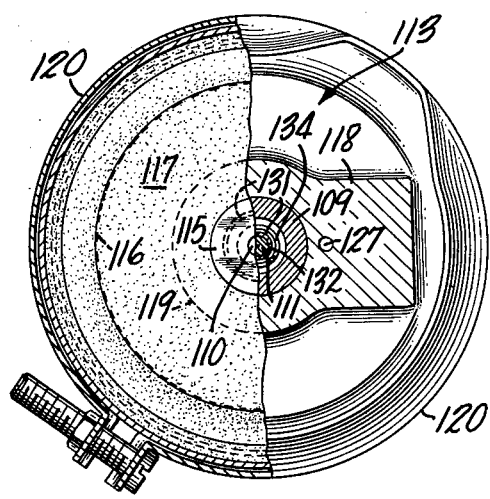
FIGURE 6 is a sectional view taken on the lines 6—6 of FIGURE 5, and looking in the direction of the arrows.

FIGURE 5 shows another embodiment of the invention especially adapted to operate at small pressure differentials such as below 15 p.s.i., but capable of response to pressure differentials over a range of from 0.01 up to about 250 p.s.i., and more.

In this embodiment, as in those described above, the first and second magnetic elements, 110 and 111 respectively, are coaxially mounted on opposite sides of the wall 112. The third, annularly shaped magnetic element 109 which, in accordance with the invention, acts to prevent false indications of excessive pressure differentials caused by shock, vibration, acceleration or the like as well as improper resetting of the indicator after a true indication of an excessive pressure differential has occurred, is mounted so that it is coaxial with and surrounds magnet 111 and has its poles opposed to magnet 111. Magnet 109 is mounted in a peripheral groove 107 within a housing 113 and is held in position within the peripheral groove 107 by a clamp 108 which is, in turn, secured to the housing by bolts. Magnet 109 is positioned with its poles opposed to those of magnet 111 and is so arranged that when magnet 111 abuts wall 112, the upper pole of magnet 109 attracts the upper pole of magnet 111, thereby reinforcing the attraction of the first magnetic element 110 and holding magnet 111 more securely against wall 112. When magnet 111 is in the upper, or indicating, position, i.e., no longer abutting wall 112, the upper poles of magnets 109 and 111 no longer attract one another to any significant extent, as the distance between them is too great. But the lower pole of magnet 111 is now sufficiently close to the lower pole of magnet 109 to be attracted by it, thereby holding magnet 111 in the upper or indicating position.

All three magnetic elements, 109, 110 and 111 may be composed of a permanently magnetized metal such as, for example, Alnico VI, or a ceramic magnetic material, or, if preferred, element 110 may be composed of a magnetic material such as iron. In this embodiment, as in those described previously, element 109 need not be an annulus, but may be made up of several bar magnets radially spaced from magnet 111 and appropriately distributed within the peripheral groove 107.

The lower magnet 110 is mounted in a tubular sleeve 114 having an enlarged head portion 115. The sleeve is inserted through the central portion of a plate 116 and attached thereto by a nut 123 and the plate 116 and enlarged head 115 of the sleeve between them hold a flexible rubber or metal diaphragm 117 in a liquid-tight seal. The attachment between the diaphragm 117 and the plate 116 can be improved, if desired, by bonding the two together. The assembly of the magnet 110, sleeve 114, plate 116, nut 123 and diaphragm 117 together constitutes a magnetic diaphragm assembly, since all respond together to magnetic attraction due to elements 111 and 109 and to pressure-actuated movement of the diaphragm 117. The diaphragm may be formed of any flexible material, such as, for example, a flexible metal sheet or a flexible synthetic resin or cellulose derivative such as cellulose acetate, polytetrafluoroethylene, polypropylene, polyethylene or polyvinylidene chloride. The metal sheet can also be of magnetic material such as Alnico VI or of magnetizable material such as an iron or nickel alloy. If the sheet is of magnetic material the separate magnetic element 110 may not be required.

The housing 113 is formed in upper and lower portions 118 and 119, respectively, held together by a clamp 120. The outer periphery of the diaphragm 117 is held between the two portions of the housing in a liquid-tight seal. Thus fluid is prevented from passing from one side of the diaphragm to the other or from the inside to the outside of the housing.

The upper and lower portions of the housing between them define a chamber 121 provided with a lower recessed portion 122 to accommodate the plate 116. The diaphragm, plate and sleeve are free to move within the chamber 121, the sleeve being reciprocatingly supported at the nut 123 upon a bias means, here shown as the coil spring 124 which urges the diaphragm assembly towards the wall 112. The coil spring is selected according to the desired actuating pressure to permit the diaphragm assembly to move downwardly when the pressure at the upper surface of the diaphragm 117 exceeds that at the lower surface by an amount equal to the actuating pressure. The large surface of the diaphragm provides great sensitivity to small changes in pressure differential across the faces of the diaphragm. Provision is made for adjustment of the pressure exerted by the spring by a screw 126.

Introduction of fluid within the chamber 121 to both sides of the diaphragm 117 is by way of passage 127 and port 128 in the upper portion 118 of the housing, giving access to the portion of chamber 121 above the upper face of the diaphragm and by way of passage 129 and port 130 in the lower portion 119 of the housing, giving access to chamber 122 and the lower face of the diaphragm. These, in turn, are connected to the portions of the fluid system or systems across which the pressure differential is to be detected by the pressure indicator.

In order to prevent dirt carried by the fluid from entering ports 128 and 130 and from reaching the narrower passages 127 and 129 and clogging these passages or the chamber 121, filter elements can be inserted in the enlarged outer portion of the port.

In the embodiment shown in FIGURE 5, the pressure indicator is adapted to provide an electrical signal to warn of a clogged filter or to stop fluid flow. To accomplish this, a switch 139 is mounted in a recess 140 affixed to the upper portion of the housing 118. Also mounted in the recess is a lever 141 pivotally supported on the housing so as to extend above the cap 132. Attached to one end of the arm 141 is an adjusting or set screw 142 and attached to the other end of the arm is a switch actuator 143 movable by the arm to actuate the switch 139 when the cap 132 rises into contact with the set screw 142 and sufficiently moves the arm 141. In order to restrict the motion of the magnet 111 and prevent it from rising completely out of the bore 131 an opposing stop piece 144 is mounted in the housing in position to intercept the set screw 142 of the lever 141 at a limiting position so set as to stop the lever 141 after actuation, to hold the magnet 111 within one-sixteenth of an inch of the normal position, thereby making the indicator automatically resetting by attraction of the magnetic element 110 upon return of the diaphragm 117 to the normal position. For this piece 144 then may be substituted a manually operated button to reset the magnet 111 after normal operating conditions are restored. To provide a remote signal of actuation to the indicator suitable conductors, not shown, from the switch 139 can be arranged in any conventional manner to complete appropriate electrical circuits whenever the switch is operated or reset. The functions of the flange 133 and the coil spring 134 are as described above for the other embodiments.

In operation, fluid under pressure from port 128 passes through the passage 127 to the top of the chamber 121 above the diaphragm, urging the diaphragm assembly downwardly against the force of the bias means 124 and the fluid pressure below the diaphragm communicated through passage 129 and port 130. Whenever the difference between the inlet and outlet pressure forces across the diaphragm is greater than the force of the spring 124 the diaphragm is driven downwardly. So long as the magnet 110 is within one-sixteenth of an inch from the wall 112, the force of magnetic attraction between magnet 110 and magnet 111 would normally be sufficient to overcome the force of the coil spring 134. Therefore the indicator would not actuate as the magnet 111 would remain in contact with wall 112. However, the influence of such forces as vibration, acceleration, or the like, could cause false actuation of the indicator by increasing the force tending to drive magnet 111 away from the wall. This is prevented, in accordance with the invention, by magnet 109 which is so placed within the structure that when magnet 111 abuts the wall 112 the upper magnetic pole of magnet 109 closely approaches and therefore attracts the upper and opposite pole of magnet 111. Thus, before actuation, magnet 109 reinforces the forces of magnetic attraction holding magnet 111 against wall 112 and thereby prevents false actuation.

After the magnetic diaphragm assembly has moved more than one-sixteenth of an inch from wall 112, the forces of magnetic attraction between magnets 110 and 111, reinforced by the forces of magnetic attraction between magnets 109 and 111, are no longer able to overcome the force of coil spring 134 and magnet 111 is driven away from the wall.

As magnet 111 rises, the distance between the upper pole of magnet 109 and the upper and opposite pole of magnet 111 increases with consequent reduction of the force of magnetic attraction between them. But, as this is occurring, the lower pole of magnet 109 and magnet 111 are coming closer together and the force of magnetic attraction between the lower poles is increased until, at the limit of upward travel of magnet 111, the lower pole of magnet 109 and the lower and opposite pole of magnet 111 are strongly attracted to one another. Thus, after actuation magnet 109 acts to retain magnet 111 in the upper, or indicating, position thereby preventing an accidental resetting of the indicator.

Thus, magnet 109 both prevents false actuation caused by shock, vibration, acceleration or the like, and ensures that shock, vibration or acceleration will not drive the magnet 111 away from its indicating position before the indication of excessive pressure differential can be observed and proper corrective action taken.

Upon actuation of the indicator, the magnetic element 111 is driven away from the wall 112 until the cap 132 contacts and lifts the set screw 142, thus raising the lever 141 to actuate the switch 139 through application of pressure to the switch actuator 143. When the diaphragm is fully deflected plate 116 enters recess 122 which serves as a stop to prevent further deflection and prevent damage from over-pressuring. If the stop piece 144 is appropriately adjusted to restrict the motion of the magnet 111 return of the magnet 110 to its normal position draws the magnet 111 back towards the wall 112, thereby overcoming the force of the spring 134 and the force of attraction between magnet 109 and 111, thereby restoring the switch.

Although the invention has been described herein with reference to specific embodiments, many modifications and variations therein will readily occur to those skilled in the art. Accordingly, all such variations and modifications are included within the intended scope of the invention as defined by the following claims.

I claim:

1. A pressure indicating device comprising a housing, first magnetic means movable towards and away from a first position, first bias means urging the first magnetic means towards and normally retaining the first magnetic means in the first position, fluid duct means communicating with a source of fluid under pressure and with one end of the magnetic means to urge it away from the first position, second magnetic means movable towards and away from the first magnetic means between first and second positions, respectively, and normally retained towards the first magnetic means by magnetic attraction when the first magnetic means is in the first position, second bias means urging the second magnetic means away from the first magnetic means selected to overcome the forces of magnetic attraction when the first magnetic means is more than a predetermined distance away from the second magnetic means, and third magnetic means retaining the second magnetic means at one of its said positions.

2. A pressure indicating device according to claim 1 wherein the third magnetic means is positioned with its poles opposed to the poles of the second magnetic means.

3. A pressure indicating device in accordance with claim 1 wherein the third magnetic means is annularly shaped and coaxial with the second magnetic means.

4. A pressure indicating device in accordance with claim 1 including stop means limiting the motion of the second magnetic means.

5. A pressure indicating device in accordance with claim 1 including thermostat means operable to retain the second magnetic means against actuation whenever the temperature is below a predetermined level.

6. A pressure indicating device according to claim 1 including an indicator operable by motion of the second magnetic means away from the first magnetic means.

7. A pressure indicating device according to claim 1 including switch means operable by motion of the second magnetic means away from the first magnetic means.

8. A pressure indicating device according to claim 1 wherein the third magnetic means supplements the magnetic attraction of the first magnetic means with the second magnetic means in the first position.

9. A pressure indicating device according to claim 1 wherein the third magnetic means retains the second magnetic means in the second position thereof whenever the second magnetic means has been moved within range thereof by the second bias means.

10. A pressure indicating device according to claim 1 wherein the third magnetic means is positioned with its poles opposing those of the second magnetic means to supplement the magnetic attraction of the first magnetic means when the second magnetic means is in the first position and to retain the second magnetic means in its second position away from the first magnetic means whenever the second magnetic means has been driven thereto by the second bias means.

11. A pressure indicating device according to claim 1 wherein the first magnetic means comprises a flexible diaphragm means movably mounted in the housing, the first magnetic means being movable with the diaphragm means towards and away from a first position.

12. A pressure indicating device in accordance with claim 1 wherein the first magnetic means comprises a piston means mounted in the housing, the first magnetic means being movable therewith towards and away from a first position.

References Cited in the file of this patent

UNITED STATES PATENTS

| | | |
|---|---|---|
| 2,869,563 | Schoengrun | Jan. 20, 1959 |
| 2,942,572 | Pall | June 28, 1960 |
| 3,077,176 | Pall et al. | Feb. 12, 1963 |
| 3,077,854 | Pall | Feb. 19, 1963 |